(12) United States Patent
Kuwahara (10) Patent No.: US 11,046,169 B2
(45) Date of Patent: Jun. 29, 2021

(54) FOUR-WHEEL DRIVE HYBRID VEHICLE

(71) Applicant: Toyota Jidosha Kabushiki Kaisha, Toyota (JP)

(72) Inventor: Seiji Kuwahara, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 713 days.

(21) Appl. No.: 15/957,300

(22) Filed: Apr. 19, 2018

(65) Prior Publication Data

US 2018/0304738 A1    Oct. 25, 2018

(30) Foreign Application Priority Data

Apr. 21, 2017   (JP) .............................. JP2017-084849

(51) Int. Cl.
| | |
|---|---|
| *B60K 6/52* | (2007.10) |
| *B60K 6/40* | (2007.10) |
| *B60K 6/44* | (2007.10) |
| *B60K 17/344* | (2006.01) |
| *B60K 17/346* | (2006.01) |
| *B60K 17/356* | (2006.01) |
| *B60K 6/442* | (2007.10) |

(52) U.S. Cl.
CPC ................. *B60K 6/52* (2013.01); *B60K 6/40* (2013.01); *B60K 6/44* (2013.01); *B60K 6/442* (2013.01); *B60K 17/344* (2013.01); *B60K 17/346* (2013.01); *B60K 17/3462* (2013.01); *B60K 17/356* (2013.01); *B60Y 2200/92* (2013.01); *B60Y 2300/84* (2013.01); *Y02T 10/62* (2013.01); *Y10S 903/916* (2013.01); *Y10S 903/951* (2013.01)

(58) Field of Classification Search
CPC ... B60K 6/52; B60K 6/40; B60K 6/44; B60K 6/442; B60K 17/344; B60K 17/346; B60K 17/3462; B60K 17/356
USPC .......................................................... 74/661
See application file for complete search history.

(56) References Cited

U.S. PATENT DOCUMENTS

| | | | |
|---|---|---|---|
| 6,327,852 B1 | 12/2001 | Hirose | |
| 6,569,055 B2 | 5/2003 | Urasawa et al. | |
| 7,125,357 B2 | 10/2006 | Porter | |

(Continued)

FOREIGN PATENT DOCUMENTS

| | | |
|---|---|---|
| CN | 101492007 A | 7/2009 |
| EP | 2 949 495 A1 | 12/2015 |

(Continued)

*Primary Examiner* — Ha Dinh Ho
(74) *Attorney, Agent, or Firm* — Oblon, McClelland, Maier & Neustadt, L.L.P.

(57) ABSTRACT

A four-wheel drive hybrid vehicle, in which all wheels are driven by an engine, and in which a spatial restriction to arrange a front motor is reduced. The hybrid vehicle comprises: an engine disposed on a side of front wheels; a first motor; an exhaust pipe for discharging exhaust gas from a rear side of the vehicle; a first propeller shaft that delivers output power of the engine to rear wheels; a transfer that distributes the output power of the engine to the front wheels; a second propeller shaft that delivers a drive force from the transfer to the front wheels; and a second motor that applies torque to the front wheels. The second propeller shaft is arranged on the other side of the exhaust pipe across the first propeller shaft while being connected to the second propeller shaft.

11 Claims, 7 Drawing Sheets

(56) References Cited

U.S. PATENT DOCUMENTS

| | | | |
|---|---|---|---|
| 9,643,490 B2* | 5/2017 | Gassmann | B60K 17/354 |
| 9,937,919 B2* | 4/2018 | Zhang | B60K 6/387 |
| 10,569,638 B2* | 2/2020 | Welschoff | B60K 6/28 |
| 2007/0267233 A1 | 11/2007 | Wenthen | |
| 2009/0186734 A1 | 7/2009 | Perkins | |
| 2009/0223725 A1 | 9/2009 | Rodriguez et al. | |
| 2015/0175153 A1* | 6/2015 | Hashimoto | B60W 20/13 |
| | | | 701/22 |
| 2015/0258886 A1 | 9/2015 | Aimo Boot et al. | |
| 2015/0360572 A1 | 12/2015 | Yamamoto et al. | |

FOREIGN PATENT DOCUMENTS

| | | |
|---|---|---|
| JP | 4-116622 U | 10/1992 |
| JP | 2005-1567 A | 1/2005 |
| JP | 2009-173272 A | 8/2009 |
| JP | 2016-002772 | 1/2016 |
| KR | 10-1534750 B1 | 7/2015 |
| WO | WO 2015/151712 A1 | 10/2015 |

\* cited by examiner

| Mode | | T/M | Engagement Device | ENG | MG1 | MG2 |
|---|---|---|---|---|---|---|
| EV | | N | ON | OFF | OFF | M (R G) |
| ENG Starting | | N | ON·OFF | Drn | M | M·OFF |
| HV | Series | N | ON | ON | G | M (R G) |
| | Parallel | D·R | ON | ON | M | M (R G) |

FOUR-WHEEL DRIVE HYBRID VEHICLE

CROSS REFERENCE TO RELATED APPLICATIONS

The present disclosure claims the benefit of Japanese Patent Application No. 2017-084849 filed on Apr. 21, 2017 with the Japanese Patent Office, the disclosure of which are incorporated herein by reference in its entirety.

BACKGROUND

Field of the Disclosure

Embodiments of the present disclosure relate to the art of a four-wheel drive hybrid vehicle in which a prime mover includes an internal combustion engine and a motor-generator, and in which both front pair of wheels and rear pair of wheels are powered.

Discussion of the Related Art

An example of this kind of hybrid vehicle is described in JP-A-2016-2772. In the hybrid vehicle shown in FIG. 1 of JP-A-2016-2772, an engine, a rear drive motor, and a transmission are arranged in order from the front side of the vehicle. A rear propeller shaft is connected to the transmission, and the rear wheels are driven by the engine. A front drive motor is disposed on an intake side of the engine, and a front drive motor is connected to a front wheel via a transmission. In the hybrid vehicle shown in FIG. 1 of JP-A-2016-2772, a transfer and a front propeller shaft are not arranged, and hence the driving motor, the transmission, a motor-generator driven by the engine can be fitted into the hybrid vehicle without interference.

The hybrid vehicle shown in FIG. 1 of JP-A-2016-2772 is a four-wheel drive hybrid vehicle in which the front wheels are driven by the front drive motor disposed adjacent to the engine in the direction parallel to the drive shafts of the front wheels. In the hybrid vehicle of this kind, a front differential gear unit is interposed between the right front wheel and the left front wheel so as to allow the right front wheel and the left front wheel to rotate relatively to each other during turning. However, if the front differential gear unit is disposed in the width center of the vehicle to minimize a difference in lengths of the left and the right drive shafts, the front differential gear unit may interfere with the engine. Thus, in the hybrid vehicle shown in FIG. 1 of JP-A-2016-2772, the front differential gear is disposed on the front wheel side in addition to the front drive motor. In the hybrid vehicle shown in FIG. 1 of JP-A-2016-2772, therefore, the front drive motor, the front differential gear unit, the transmission mechanism connecting the front drive motor to the front differential gear, etc., have to be downsized. Consequently, driving performance of the four-wheel drive hybrid vehicle may be restricted. In addition, since the front drive motor and the transmission mechanism are arranged adjacent to the engine in the width direction, a front weight of the four-wheel drive hybrid vehicle may be heavier than a rear weight. That is, in the four-wheel drive hybrid vehicle, a position the center of gravity may deviate to the front side. As a result, running stability and turning performance may be reduced.

SUMMARY

Aspects of embodiments of the present disclosure have been conceived noting the foregoing technical problems, and it is therefore an object of the present disclosure is to provide a four-wheel drive hybrid vehicle, in which all wheels are driven by an engine, and in which a spatial restriction to arrange a front motor for driving a front pair of wheels is reduced.

The present disclosure relates to a four-wheel drive hybrid vehicle, comprising a first pair of drive wheels disposed on a front side or rear side of a vehicle body, and a second pair of drive wheels disposed on the other side of the vehicle body. In order to achieve the above-explained objective, according to the embodiment of the present disclosure, the four-wheel drive hybrid vehicle is provided with: an engine disposed on a side of the first pair of drive wheels; a first motor that generates a torque to be added to an output torque of the engine; an exhaust pipe for discharging exhaust gas of the engine from a rear side of a vehicle body; a first propeller shaft that delivers an output power of the engine to the second pair of drive wheels; a transfer that distributes the output power of the engine to the first pair of drive wheels; a second propeller shaft that delivers a drive force from the transfer to the first pair of drive wheels; and a second motor having a generating function, which applies torque to the first pair of drive wheels, and to which torque of the first pair of drive wheels is applied. Specifically, the second propeller shaft is arranged on the other side of the exhaust pipe in a width direction of the vehicle body across the first propeller shaft, and the second motor is connected to the second propeller shaft.

In a non-limiting embodiment, the four-wheel drive hybrid vehicle may further comprise a transmission device that connects the second motor to the second propeller shaft in a torque transmittable manner.

In a non-limiting embodiment, the transmission device may include a speed reducing device that reduces a rotational speed of the second propeller shaft lower than the rotational speed of the second motor.

In a non-limiting embodiment, the transmission device may comprise an engagement device that selectively interrupts torque transmission between the second motor and the second propeller shaft.

In a non-limiting embodiment, the second propeller shaft may extend in a longitudinal direction of the vehicle body. The second propeller shaft may comprise a first end situated on a side of the first pair of drive wheels, and a second end situated on the other side of the first end in the longitudinal direction of the vehicle body. The second motor, or the second motor and the transmission device may be disposed on the second end side.

In a non-limiting embodiment, the first pair of drive wheels may be a pair of front wheels, and the second pair of wheels may be a pair of rear wheels.

In a non-limiting embodiment, the four-wheel drive hybrid vehicle may further comprise a transmission that is connected to an output side of the engine. The transmission may comprise a clutch that is engaged to transmit torque, and that is disengaged to interrupt torque transmission.

In a non-limiting embodiment, the first motor may be disposed on an input side of the transmission coaxially with the engine, and the transfer may be connected to an output side of the transmission.

In a non-limiting embodiment, the second motor may be situated closer to the second pair of wheels than the transfer.

In a non-limiting embodiment, the first motor may have a generating function.

Thus, according to the embodiment of the present disclosure, the second motor is connected to the second propeller shaft for transmitting torque between the transfer to the first pair of drive wheels. Specifically, the second motor is arranged together with the second propeller shaft on the other side of the exhaust pipe across the first propeller shaft. According to the embodiment, therefore, the second motor may be arranged utilizing an available space on the other side of the exhaust pipe across the first propeller shaft. In other words, a two-motor type hybrid vehicle may be formed without modifying the four-wheel drive hybrid vehicle significantly.

According to the embodiment in which the transmission device connecting the second motor to the second propeller shaft is adapted to serve as a speed reducing device, a low-torque/high speed type motor may be used as the second motor. That is, the second motor may be downsized to be fitted easily in the vehicle body to form the two-motor type hybrid vehicle, even if an available space on the other side of the exhaust pipe across the first propeller shaft is small.

When propelling the vehicle by the engine or by the engine and the first motor, the second motor will not be rotated passively by disengaging the engagement device of the transmission device to disconnect the second motor from the second propeller shaft. For this reason, a power loss resulting from rotating the second motor passively may be reduced.

According to the embodiment in which the second motor is disposed on the second end side of the second propeller shaft, the second propeller shaft and the second motor may be displaced from each other in a length direction of the second propeller shaft. For this reason, a diameter of the second propeller shaft will not be restricted by the second motor and hence a sufficient thickness of the second propeller shaft can be maintained.

According to the embodiment in which the output power of the engine is delivered to the rear wheels through the first propeller shaft and to the front wheels through the transfer and the second propeller shaft, a vertical force at the front wheels or a slip limit of the front wheels during decelerating the vehicle. For this reason, the second motor is allowed to regenerate electricity efficiently.

According to the embodiment in which the transmission having the clutch is disposed between the engine or the first motor and the first propeller shaft, a series mode can be established by rotating the first motor by the engine to serve as a generator while operating the second motor as a motor by supplying electricity generated by the first motor. That is, selection of the operating mode of the vehicle may be increased to include e.g., an engine starting mode in which the engine is started by the first motor.

In addition, a space for the second motor may be increased by arranging the second motor second motor closer to the rear pair of wheels than the transfer and the transmission. For this reason, a larger motor may be employed as the second motor.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
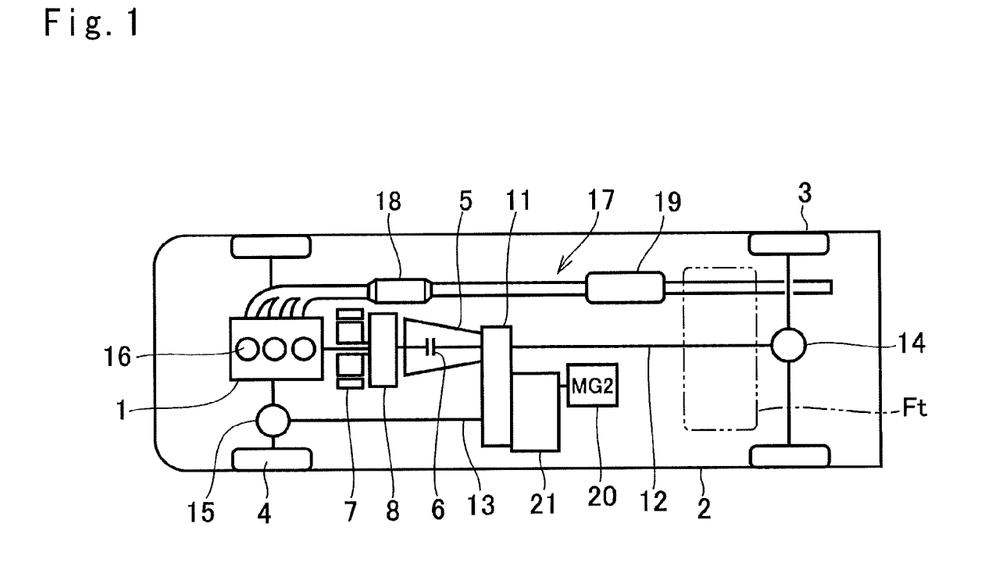
FIG. 1 is a schematic illustration showing a power train of the four-wheel drive hybrid vehicle according to the embodiment of the present disclosure.

Embodiments of the present disclosure will now be explained with reference to the accompanying drawings. Turning now to FIG. 1, there is shown an example of a powertrain of a four-wheel drive hybrid vehicle according to the embodiment of the present disclosure. The vehicle shown in FIG. 1 is an FR (i.e., front-engine rear-drive layout) based four-wheel drive vehicle. In the vehicle shown in FIG. 1, an engine 1 is arranged in a front side of the vehicle, and rear wheels 3 are driven by a power generated by the engine 1. Specifically, the engine 1 is disposed between front wheels 4 (i.e., at about the width center of the vehicle) in such a manner that an output shaft (i.e., a crankshaft, not shown) extends toward the rear side of the vehicle. In the embodiment, accordingly, the pair of front wheels 4 serves as a first pair drive wheels, and the pair of rear wheels 3 serve as a second pair of drive wheels.

A transmission 5 as an automatic transmission is disposed on an output side of the engine 1, and the output shaft of the engine 1 is connected to an input shaft of the transmission 5. The transmission 5 is adapted to change a ratio of an input speed to an output speed arbitrarily. For example, a geared transmission in which a gear stage is shifted stepwise, and a continuously variable transmission in which a speed ratio is varied continuously may be used as the transmission 5. The transmission 5 is provided with a clutch 6 that is engaged to transmit torque, and that is disengaged to interrupt torque transmission thereby establishing a neutral state.

Thus, the engine 1 and the transmission 5 are arranged coaxially to each other, and a first motor-generator (as will be simply called the "first motor" hereinafter) 7 is disposed between the engine 1 and the transmission 5 while being connected to the output shaft of the engine 1 or the input shaft of the transmission 5. The first motor 7 is used mainly to generate a drive torque to propel the vehicle, and also to generate a motoring torque to start the engine 1. In a series hybrid mode, the first motor 7 is used to generate electricity. Specifically, the first motor 7 may be connected to the output shaft of the engine 1 or the input shaft of the transmission 5 not only directly but also indirectly through a transmission device 8.

Figure 2:
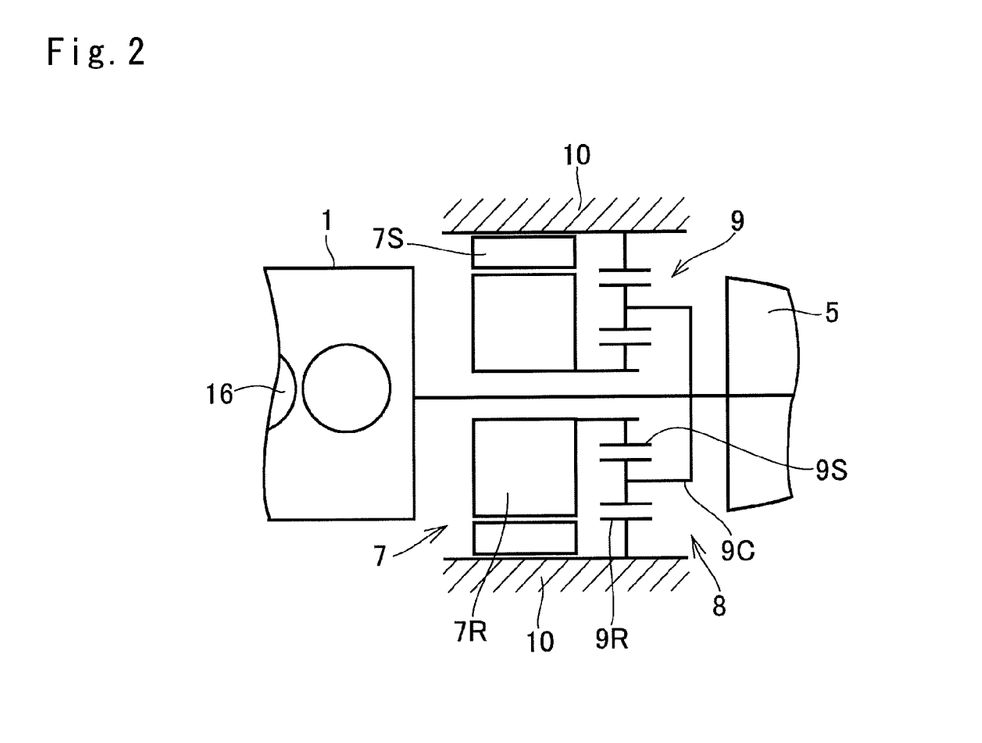
FIG. 2 is a schematic illustration showing an example of a transmission mechanism connected to a first motor.

One example of the transmission device 8 is shown in FIG. 2. In the example shown in FIG. 2, a planetary gear unit 9 adapted to serve as a speed reducing device is used as the transmission device 8. The planetary gear unit 9 comprises a sun gear 9S, a ring gear 9R as an internal gear that is arranged coaxially around the sun gear 9S, a plurality of pinion gears interposed between the sun gear 9S and the ring gear 9R, and a carrier 9C a that supports the pinion gears in a rotatable manner. In the planetary gear unit 9, the sun gear 9S is fitted onto the output shaft of the engine 1 or the input shaft of the transmission 5, the ring gear 9R is fixed to a stationary member 10 such as a casing, and the carrier 9C is connected to the output shaft of the engine 1 or the input shaft of the transmission 5. On the other hand, in the first motor 7, a rotor 7R is fitted onto the output shaft of the engine 1 or the input shaft of the transmission 5 while being connected to the sun gear 9S, and a stator 7S is fixed to the stationary member 10. In the example thus using the planetary gear unit 9 as the transmission device 8, the transmission device 8 and the first motor 7 may be arranged coaxially with the engine 1 and the transmission 5 so that the powertrain is downsized entirely. Especially, a maximum outer diameter of the powertrain can be reduced.

Figure 3:
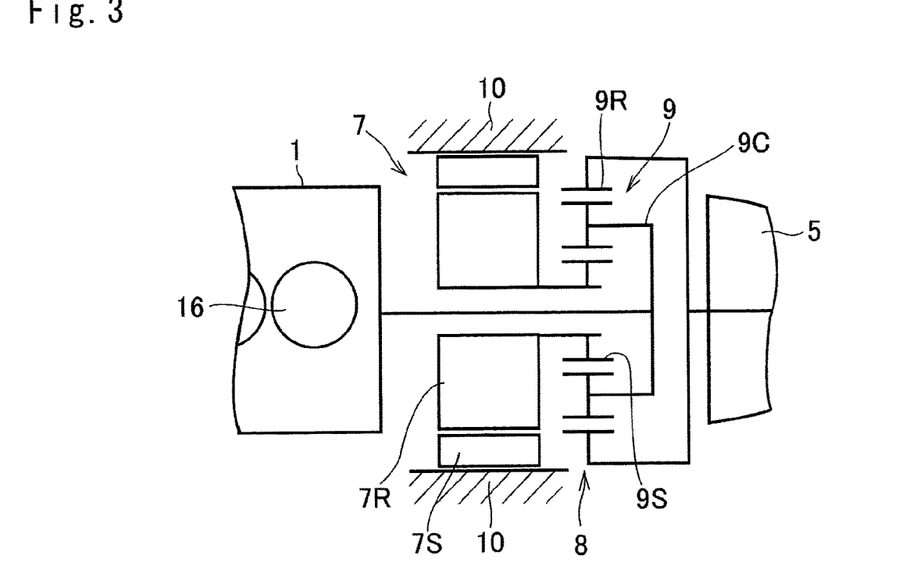
FIG. 3 is a schematic illustration showing an example of using the transmission mechanism connected to the first motor as a power split device.

As shown in FIG. 3, the planetary gear unit 9 used as the transmission device 8 may also be adapted to serve as a power split device. In the example shown in FIG. 3, a single-pinion planetary gear unit is used as the planetary gear unit 9. In the planetary gear unit 9, specifically, the sun gear 9S is fitted onto the output shaft of the engine 1 while being connected to the rotor 7R of the first motor 7, the carrier 9C is connected to the output shaft of the engine 1, and the ring gear 9R is connected to the input shaft of the transmission 5. In the example shown in FIG. 3, an output power of the engine 1 may be distributed to the first motor 7 and to the transmission 5 so that the first motor 7 is rotated by the engine 1 to generate electricity, and a reaction torque of the first motor 7 may be applied to the sun gear 9S. In the example shown in FIG. 3, therefore, a rotational speed of the engine 1 may be adjusted in an optimally fuel efficient manner, and a synthesized torque of the output torque of the engine 1 and the reaction torque of the first motor 7 may be applied to the transmission 5.

In the case of directly connecting the first motor 7 to the output shaft of the engine 1 or the input shaft of the transmission 5, the rotor 7R of the first motor 7 may be fitted directly onto the output shaft of the engine 1 or the input shaft of the transmission 5 to be rotated integrally with those shafts.

Turning back to FIG. 1, a transfer 11 is disposed on an output side of the transmission 5 to distribute output power of the engine 1 or output torque of the transmission 5 to the front wheels 4 and the rear wheels 3. A rear propeller shaft 12 as a first propeller shaft is connected to an output member (not shown) to deliver torque to the rear wheels 3, and a front propeller shaft 13 as a second propeller shaft is connected to an output member (not shown) to deliver torque to the front wheels 4.

For example, a wrapping transmission using a chain or belt, a gear unit and so on may be used as the transfer 11. In addition, a full-time four-wheel drive mechanism including a differential mechanism that allows a differential rotation between the front wheels 4 and the rear wheels 3 and a restriction mechanism that restricts the differential rotation between the front wheels 4 and the rear wheels 3, and a part-time four-wheel drive mechanism that selectively interrupt torque transmission to the front wheels 4 may also be used as the transfer 11.

Specifically, the rear propeller shaft 12 extends from the transmission 5 or the transfer 11 to be connected to a rear differential gear unit 14 as a final reduction to distribute torque to the rear wheels 3. On the other hand, the front propeller shaft 13 also extends from the transmission 5 or the transfer 11 to be connected to a front differential gear unit 15 as a final reduction to distribute torque to the front wheels 4.

The engine 1 is an internal combustion engine to generate mechanical power by burning air/fuel mixture such as gasoline comprising a plurality of cylinders 16 and an exhaust pipe 17 for discharging exhaust gas. The exhaust pipe 17 includes an exhaust manifold connected to the cylinders 16 and a pipe connected to the exhaust manifold to discharge the exhaust gas from a rear side of a vehicle body 2. In the exhaust pipe 17, a purifying catalyst 18 is disposed on an upstream side, and a muffler 19 is disposed on a downstream side of the purifying catalyst 18.

Specifically, the engine 1 is a straight engine in which the cylinders 16 are arranged in line, and the exhaust pipe 17 is connected to a right side or a left side of the engine 1. As illustrated in FIG. 1, the exhaust pipe 17 extends backwardly on the right side or the left side in the vehicle body 2. On the other hand, the front propeller shaft 13 extends on the other side of the exhaust pipe 17 in the width direction of the vehicle body 2 across the engine 1 and the transmission 5. The exhaust pipe 17, the front propeller shaft 13, the transmission 5, the transfer 11, the rear propeller shaft 12 etc. are arranged underneath a floor panel (not shown).

A second motor-generator (as will be simply called the "second motor" hereinafter) 20 is connected to the front propeller shaft 13. The second motor 20 is used not only to generate a drive torque to propel the vehicle, but also to generate electricity when the vehicle decelerates. For example, a permanent magnet synchronous motor may be used as the second motor 20. The second motor 20 may also be connected to the front propeller shaft 13 not only directly but also indirectly through a transmission device 21.

Figure 4:
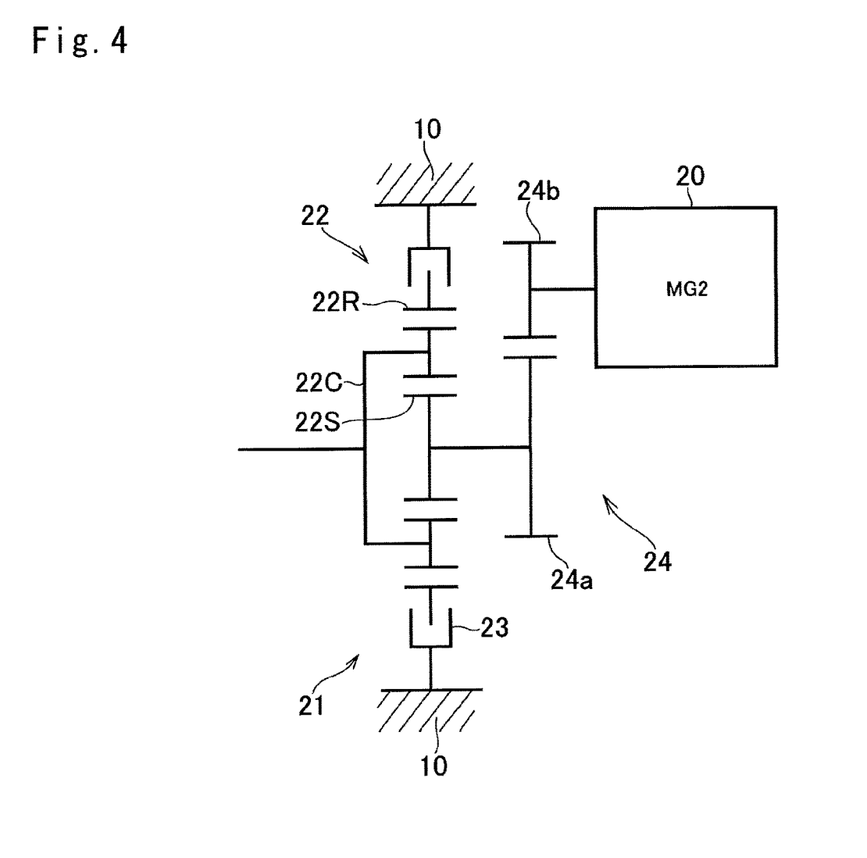
FIG. 4 is a schematic illustration showing an example of a transmission mechanism connected to a second motor.

One example of a structure of the transmission device 21 is shown in FIG. 4. According to the example shown in FIG. 4, the transmission device 21 comprises a planetary gear unit 22, an engagement device 23, and a reduction gear pair 24. Specifically, the planetary gear unit 22 is a single-pinion planetary gear unit, and disposed coaxially with the front propeller shaft 13 in a rear side of the front propeller shaft 13. The planetary gear unit 22 comprises a sun gear 22S, a ring gear 22R as an internal gear arranged concentrically with the sun gear 22S, a plurality of pinion gears interposed between the sun gear 22S and the ring gear 22R, and a carrier 22C supporting the pinion gears in a rotatable manner. The carrier 22C is connected to the front propeller shaft 13, and the engagement device 23 is disposed between the ring gear 22R and the stationary member 10. The engagement device 23 is engaged to connect the ring gear 22R o the stationary member 10 thereby stopping a rotation of the ring gear 22R, and disengaged to allow the ring gear 22R to rotate. For example, a dog clutch and a friction clutch may be used as the engagement device 23.

Here will be explained a structure and an advantage of the engagement device 23. When the engagement device 23 is in engagement, the ring gear 22R is halted so that the planetary gear unit 22 serves as a speed reducing device. By contrast, when the engagement device 23 is in disengagement, the reaction force is not applied to the ring gear 22R so that the planetary gear unit 22 (or the transmission device 21) is brought into the neutral state in which the torque is not transmitted through the planetary gear unit 22. That is, when propelling the vehicle by the engine 1, the second motor 20 will not be rotated passively by disengaging the engagement device 23 to disconnect the second motor 20 from the front propeller shaft 13. For this reason, a rotational speed of the front propeller shaft 13 will not be restricted by a structural limitation such as a maximum speed of the second motor 20, even when the vehicle is propelled by the engine 1 at a high speed (e.g., higher than 130 km/h).

A speed of the second motor 20 with respect to a predetermined vehicle speed is increased with an increase in a reduction ratio achieved by the reduction gear pair 24 and the planetary gear unit 22. However, the second motor 20 can be prevented from being rotated at an excessively high speed by a torque of the front propeller shaft 13, by disengaging the engagement device 23 to disconnect the second motor 20 from the front propeller shaft 13. In other words, since the second motor 20 can be disconnected from the front propeller shaft 13 by disengaging the engagement device 23, the reduction ratios of the reduction gear pair 24 and the planetary gear unit 22 can be increased. Consequently, a drive force of the front wheels 4 can be increased to enhance acceleration when propelling the vehicle by the second motor 20, especially, when launching the vehicle by the second motor 20.

The reduction gear pair 24 comprises a driven gear 24a connected to the sun gear 22S, and a drive gear 24b that is diametrically smaller (in other words, whose teeth number is smaller) than the driven gear 24a. The second motor 20 is connected to the drive gear 24b. Accordingly, when the second motor 20 is operated as a motor to generate torque, the driven gear 24a and the sun gear 22S are rotated at a lower speed than a rotational speed of the second motor 20. In addition, when the engagement device 23 is engaged to halt the ring gear 22R, a rotational speed of the carrier 22C as an output element is reduced lower than a rotational speed of the sun gear 22S as an input element. Consequently, a rotational speed of the front propeller shaft 13 connected to the carrier 22C is reduced lower than the rotational speed of the second motor 20. Thus, the transmission device 21 serves as a speed reducing device.

In the example shown in FIG. 4, the second motor 20 is connected to the rear end of the front propeller shaft 13. Specifically, the second motor 20 is situated in the rear side of the transmission 5 and the transfer 11 without interference with the transmission 5 and the transfer 11. In other words, the second motor 20 and the transmission device 21 are arranged utilizing an existing space of the four-wheel drive vehicle underneath the floor panel. For this reason, a two-motor type hybrid vehicle may be formed without modifying the four-wheel drive hybrid vehicle significantly. In addition, since the second motor 20 is connected to the front propeller shaft 13 through the transmission device 21 serving as a speed reducing device, torque of the second motor 20 is delivered to the front propeller shaft 13 while being multiplied by the transmission device 21. For this reason, a low-torque/high speed type motor may be used as the second motor 20. That is, the second motor 20 may be downsized to be fitted easily in the vehicle body 2.

In addition, the second motor 20 and the transmission device 21 are arranged in a manner such that the second motor 20 and the transmission device 21 do not interfere with a fuel tank Ft shown in FIG. 1. Alternatively, dimensions of the fuel tank Ft may also be altered in accordance with arrangements of the second motor 20 and the transmission device 21. In this case, however, it is not necessary to modify the structure of the vehicle body 2 significantly.

Figure 5:
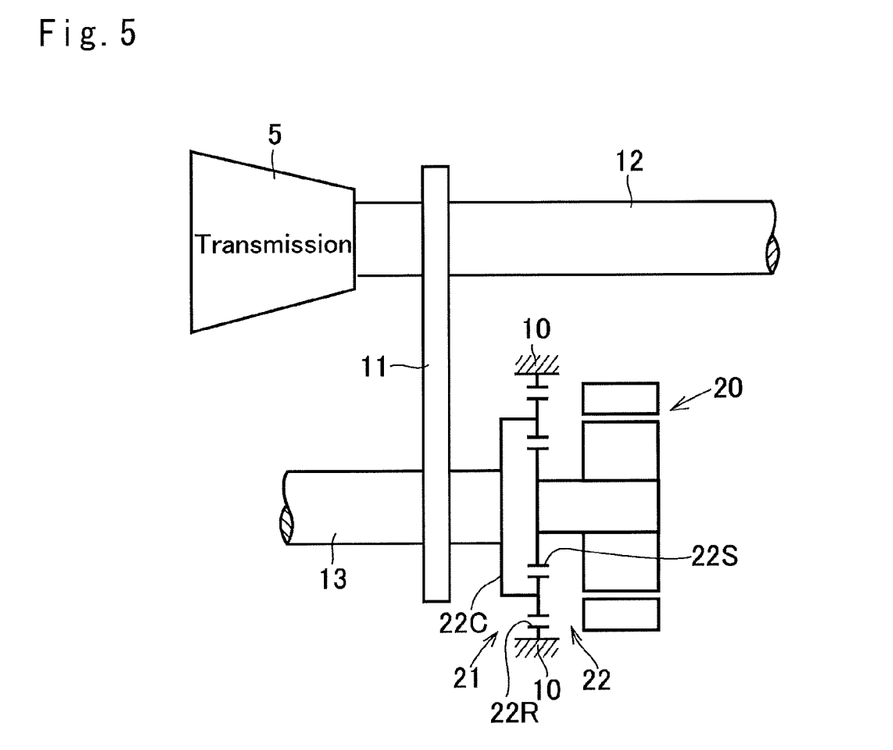
FIG. 5 is a schematic illustration showing a modification example of the transmission mechanism shown in FIG. 4.

According to the embodiment, the second motor 20 may also be connected always to the front propeller shaft 13. FIG. 5 shows a modification example of the example shown in FIG. 4 in which the ring gear 22R is fixed to the stationary member 10 without interposing the engagement device 23, and the second motor 20 is connected directly to the carrier 22C without interposing the reduction gear pair 24.

In the example shown in FIG. 5, the second motor 20 is always rotated during propulsion of the vehicle. For example, when an accelerator pedal is depressed, the second motor 20 may be operated as a motor by supplying electricity to the second motor 20 so as to assist a drive torque delivered to the front wheels 4 by an output torque of the second motor 20. By contrast, when the vehicle is decelerated, the second motor 20 may be operated as a generator by the torque applied from the front wheels 4 so as to regenerate energy. In the example shown in FIG. 5, since the planetary gear unit 22 also serves as a speed reducing device, a low-torque/high speed type motor may also be used as the second motor 20 to downsize the second motor 20. In addition, in the example shown in FIG. 5, the second motor 20 may be disposed coaxially with the front propeller shaft 13 while utilizing a longitudinal space in the vehicle body 2.

Figure 6:
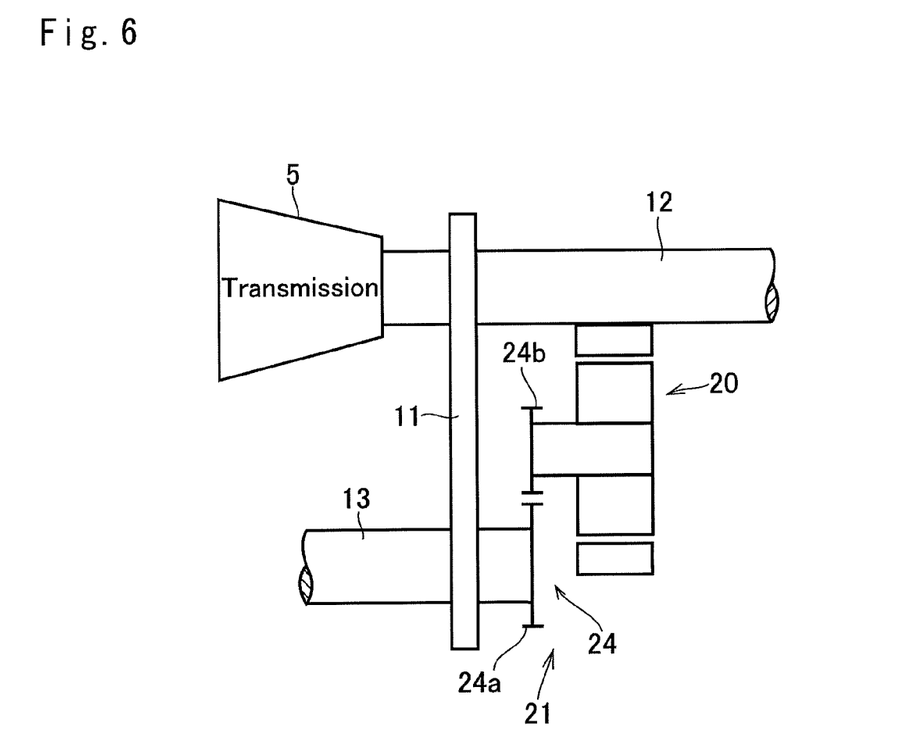
FIG. 6 is a schematic illustration showing another modification example of the transmission mechanism shown in FIG. 4.

FIG. 6 is shows another modification example of the example shown in FIG. 4 in which the planetary gear unit 22 is omitted and the driven gear 24a of the reduction gear pair 24 is connected directly to the front propeller shaft 13. In the example shown in FIG. 6, the second motor 20 is also rotated always during propulsion of the vehicle. When an accelerator pedal is depressed, the second motor 20 may also be operated as a motor by supplying electricity to the second motor 20 so as to assist a drive torque delivered to the front wheels 4 by an output torque of the second motor 20. By contrast, when the vehicle is decelerated, the second motor 20 may also be operated as a generator by the torque applied from the front wheels 4 so as to regenerate energy. In the example shown in FIG. 6, the second motor 20 is offset from the front propeller shaft 13. In this case, in order to avoid interference with a side member (not shown) of the vehicle body 2, it is preferable to dispose the second motor 20 between a center axis of the rear propeller shaft 12 and a center axis of the front propeller shaft 13.

Figure 7:
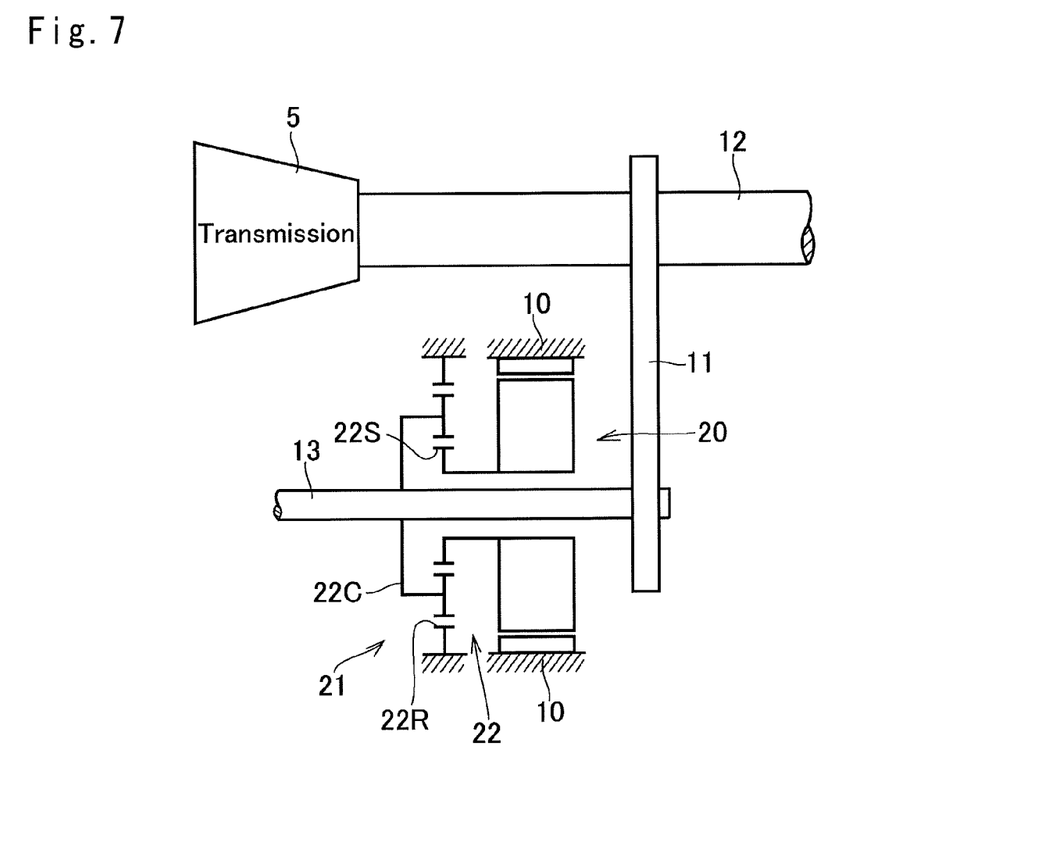
FIG. 7 is a schematic illustration showing an example of arranging the second motor and the transmission mechanism concentrically with a front propeller shaft.

FIG. 7 shows an example in which the second motor 20 and the planetary gear unit 22 are arranged around a rear end portion of the front propeller shaft 13. Specifically, the second motor 20 and the planetary gear unit 22 are arranged in front of the transfer 11 in the longitudinal direction of the vehicle body 2. The sun gear 22S of the planetary gear unit 22 is shaped into a cylindrical gear, and fitted onto the front propeller shaft 13. A cylindrical rotor of the second motor 20 is also fitted onto the front propeller shaft 13n and connected to the sun gear 22S. In the example shown in FIG. 7, in order to arrange the second motor 20 and the planetary gear unit 22 without interference with the transmission 5, the transfer 11 may be withdrawn backwardly from the transmission 5 to create a space for holding the second motor 20 and the planetary gear unit 22. However, outer diameters of the second motor 20 and the planetary gear unit 22 may be restricted to avoid interference with other members, and hence an outer diameter of the front propeller shaft 13 may be restricted. For this reason, the example shown in FIG. 7 is suitable for a vehicle in which torque applied to the front wheels 4 or the front propeller shaft 13 is small.

Figure 8:
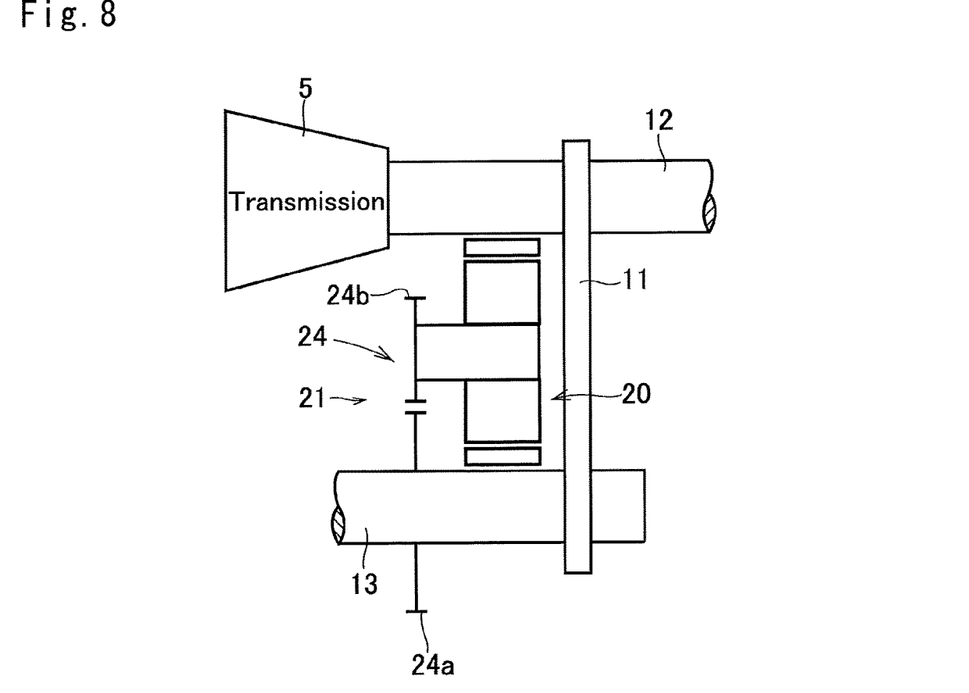
FIG. 8 is a schematic illustration showing an example of arranging the second motor and the transmission mechanism in front of a transfer.

FIG. 8 shows an example in which the second motor 20 and the reduction gear pair 24 are arranged concentrically with the front propeller shaft 13, instead of the second motor 20 and the planetary gear unit 22. In the example shown in FIG. 8, a space is maintained between the transmission 5 and the transfer 11, and the second motor 20 is disposed between the transmission 5 and the transfer 11. The drive gear 24b is attached to the second motor 20, and the driven gear 24a is fitted onto the front propeller shaft 13 while being meshed with the drive gear 24b. In the example shown in FIG. 8, the outer diameter of the front propeller shaft 13 will not be especially restricted. However, since the rear propeller shaft 12, the second motor 20, and the front propeller shaft 13 are arranged parallel to one another in the width direction of the vehicle body 2, the example shown in FIG. 8 is suitable for a vehicle having a wide width.

Figure 9:
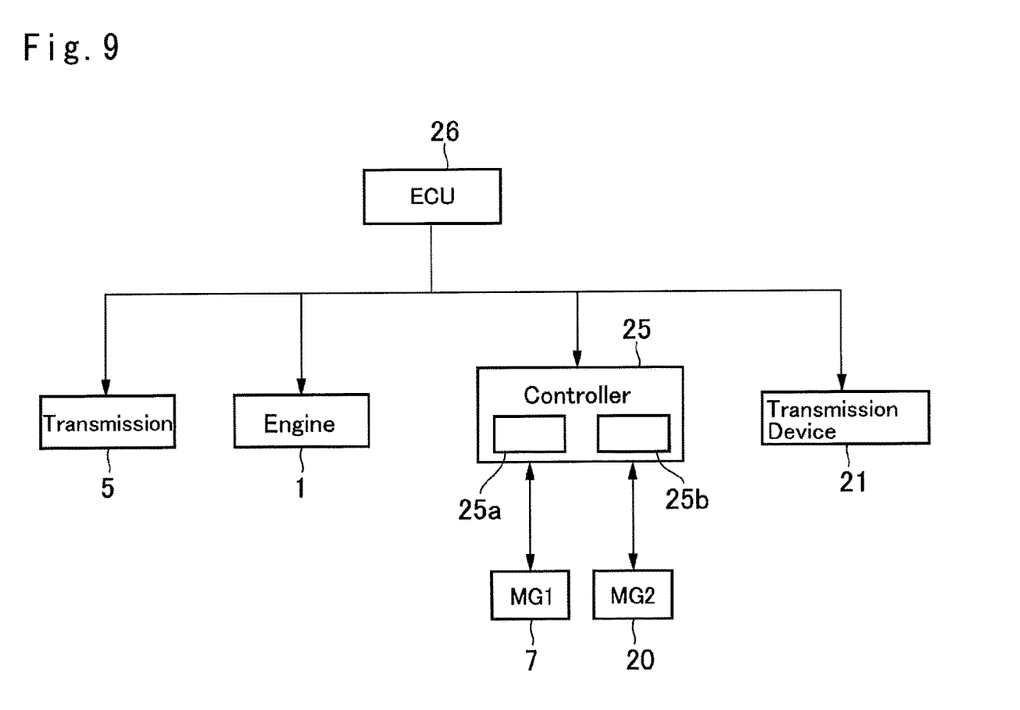
FIG. 9 is a block diagram showing a structure of a control system.

Thus, the four-wheel drive hybrid vehicle according to the embodiment is provided with two motors 7 and 20 so that a plurality of operating modes can be established. FIG. 9 shows a control system of the four-wheel drive hybrid vehicle having the transmission device 8 in FIG. 2 and the transmission device 21 shown in FIG. 4. An ignition timing, an opening degree of a throttle valve etc. of the engine 1, and a driving range such as a forward range and a reverse range, a gear stage etc. of the transmission 5 may be controlled electrically. In the transmission device 21, the engagement device 23 may be engaged and disengaged electrically. The first motor 7 (referred to as "MG1" in the drawings) and the second motor 20 (referred to as "MG2" in the drawings) are connected individually to a controller 25 comprising a battery 25a and an inverter 25b so that each of the first motor 7 and the second motor 20 is operated selectively as a motor and a generator by the controller 25.

The engine 1, the transmission 5, the transmission device 21, and the controller 25 are connected to an electronic control unit (to be abbreviated as the "ECU" hereinafter) 26. The ECU 26 is composed mainly of a microcomputer configured to execute a calculation based on an incident data and data stored in advance, and to transmit a calculation result in the form of command signal. To this end, the ECU 26 receives data about a position of an accelerator pedal representing a drive demand, a vehicle speed, a pedal force applied to a brake pedal or a depression of the brake pedal representing a brake demand, a state of charge level (to be abbreviated as the "SOC" hereinafter), wheel speeds of the front wheels 4 and the rear wheels 3, a temperature of coolant for cooling the engine 1, and so on.

Figure 10:
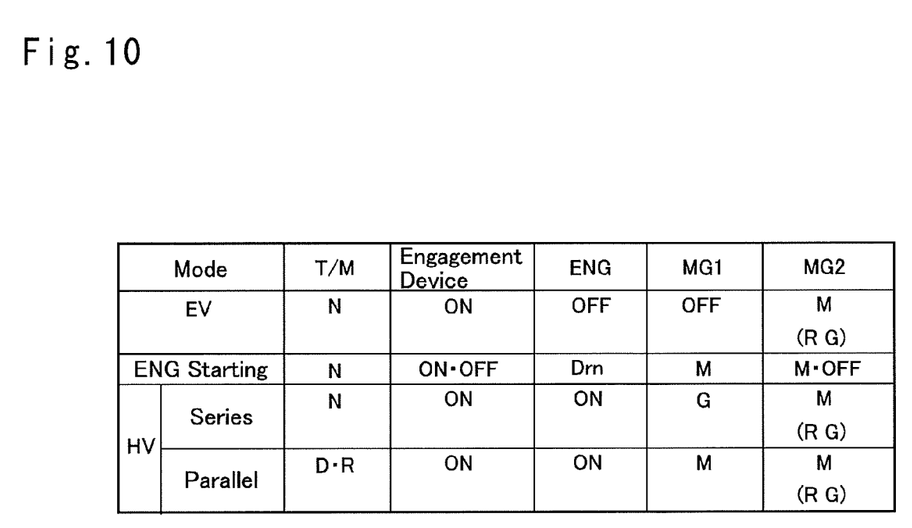
FIG. 10 is a table showing conditions of the engine, a transmission, an engagement device, and the motors in each operating mode.

The operating modes of the vehicle established by the ECU 26 are shown in FIG. 10. In the column representing "Mode" in FIG. 10, "EV" represents an Electric Vehicle mode in which the vehicle is powered without using the engine 1, "ENG Starting" represents an engine starting mode in which the stopping engine 1 is started, and "HV" represents a Hybrid mode in which the vehicle is powered by the engine 1 and any of the first motor 7 and the second motor 20. In the hybrid mode, "Series" represents a series mode in which the second motor 20 is driven by the electricity generated by the first motor 7, and "Parallel" represents a parallel mode in which the vehicle is powered by the engine 1, the first motor 7, and the second motor 20. In the column representing "T/M", "N" represents a neutral condition in which the transmission 5 does not transmit torque, and "D·R" represent that the transmission 5 establishes any one of the gear stages in a forward range or a reverse range. In the column representing "Engagement Device", "ON" represents that the engagement device 23 is in engagement, "OFF" represents that the engagement device 23 is in disengagement, and "ON•OFF" represents a state that the engagement device 23 may be not only engaged but also disengaged. In the column representing "ENG", "OFF" represents that the engine 1 is stopped, "ON" represents that the engine 1 is driven to generate torque, and "Drn" represents that the engine 1 is rotated to be started (i.e., a motoring or cranking). In the columns representing "MG1" and "MG2", "OFF" represents that the first motor 7 or the second motor 20 is stopped, "M" represents that the first motor 7 or the second motor 20 is operated as a motor, "G" represents that the first motor 7 or the second motor 20 is operated as a generator, and "RG" represents that the first motor 7 or the second motor 20 regenerates electricity.

When the SOC level is sufficiently high and a depression of the accelerator pedal is small, the Electric Vehicle mode is selected. In the Electric Vehicle mode, a predetermined clutch or brake of the transmission 5 is disengaged to bring the transmission 5 into the neutral state, and the engine 1 is stopped by stopping a fuel supply thereto and an ignition thereof. In addition, the first motor 7 is also stopped. On the other hand, the second motor 20 is operated as a motor, and the engagement device 23 is engaged to transmit a drive torque generated by the second motor 20 to the front wheels 4. In the Electric Vehicle mode, even if the low-torque/high speed type motor is used as the second motor 20, a drive torque can be ensured sufficiently by using the transmission device 21 adapted to serve as a speed reducing device to multiply the output torque of the second motor 20.

When the accelerator pedal is returned or a brake pedal is depressed during propulsion in the Electric Vehicle mode, the second motor 20 serves as a generator to generate electricity (i.e., regeneration). In this situation, specifically, energy of the inertially rotating front wheels 4 is delivered to the second motor 20 to be regenerated into electricity. A regeneration efficiency may be improved by increasing a vertical force at the front wheels 4 or a slip limit of the front wheels 4 to increase a regenerative torque or a regenerative speed.

A motoring to start the engine 1 is carried out by the first motor 7. For example, a condition to start the engine 1 is satisfied when the SOC level falls below a predetermined level, when a temperature of the engine 1 falls below a predetermined level, or when the accelerator pedal is depressed to increase the drive force. When starting the engine 1, the first motor 7 is operated as a motor to rotate the crankshaft of the engine 1, and the transmission 5 is brought into the neutral state to interrupt torque transmission. In this situation, the second motor 20 is stopped or operated as a motor depending on a running condition of the vehicle, and the engagement device 23 is engaged or disengaged depending on a running condition of the vehicle.

In the series mode, the first motor 7 is rotated by the engine 1 to generate electricity, and the second motor 20 is operated as a motor by the electricity generated by the first motor 7 to generate a drive torque to propel the vehicle. Thus, the engine 1 is driven, and the first motor 7 is operated as a generator. In this situation, the transmission 5 is brought into the neutral state so as not to deliver the drive torque of the engine 1 to the rear wheels 3, and the engagement device 23 is engaged to transmit the drive torque of the second motor 20 to the front wheels 4. When the vehicle is decelerated during propulsion in the series mode, the second motor 20 also regenerates energy as in the Electric Vehicle mode.

In the parallel mode, the vehicle is powered by the engine 1 and both of the first motor 7 and the second motor 20. To this end, the first motor 7 is operated as a motor by the electricity supplied from the battery 25a, and a predetermined gear stage (including the reverse stage) is established in the transmission 5 to transmit the drive torque of the engine 1 to the rear wheels 3. In the parallel mode, specifically, the drive torques of the engine 1 and the first motor 7 are delivered not only to the rear wheels 3 through the transmission 5 but also to the front wheels 4 through the transfer 11, and the drive torque of the second motor 20 is delivered to the front wheels 4. In the parallel mode, therefore, the drive force to propel the vehicle is increased to enhance a driving performance of the vehicle especially on a rough road. When the vehicle is decelerated during propulsion in the parallel mode, both of the first motor 7 and the second motor 20 are operated as generators by delivering inertia torques of the front wheels 4 and the rear wheels 3 to the first motor 7 and the second motor 20. Since a vertical force at the front wheels 4 or a slip limit of the front wheels 4 is large in the parallel mode, electricity can be regenerated efficiently.

Although the above exemplary embodiments of the present disclosure have been described, it will be understood by those skilled in the art that the present application should not be limited to the described exemplary embodiments, and various changes and modifications can be made within the scope of the present disclosure. For example, the engine 1 may also be disposed in front of the rear wheels 3 in such a manner as to deliver the drive torque to the front wheels 4 and to the rear wheels 3 through the transfer 11. In addition, in the planetary gear unit used as the transmission device, connections of the sun gear, the ring gear, and the carrier may be altered according to need.

What is claimed is:

1. A four-wheel drive hybrid vehicle, comprising:
    a first pair of drive wheels disposed on a front side or rear side of a vehicle body;
    a second pair of drive wheels disposed on the other side of the vehicle body;
    an engine that is disposed on a side of the first pair of drive wheels;
    a first motor that generates a torque to be added to an output torque of the engine;
    an exhaust pipe for discharging exhaust gas of the engine from a rear side of a vehicle body;
    a first propeller shaft that delivers an output power of the engine to the second pair of drive wheels;
    a transfer that distributes the output power of the engine to the first pair of drive wheels;
    a second propeller shaft that delivers a drive force from the transfer to the first pair of drive wheels; and
    a second motor having a generating function, which applies torque to the first pair of drive wheels, and to which torque of the first pair of drive wheels is applied,
    wherein the second propeller shaft is arranged on the other side of the exhaust pipe in a width direction of the vehicle body across the first propeller shaft, and
    the second motor is connected to the second propeller shaft.

2. The four-wheel drive hybrid vehicle as claimed in claim 1, further comprising:
    a transmission device that connects the second motor to the second propeller shaft in a torque transmittable manner.

3. The four-wheel drive hybrid vehicle as claimed in claim 2, wherein the transmission device includes a speed reducing device that reduces a rotational speed of the second propeller shaft lower than the rotational speed of the second motor.

4. The four-wheel drive hybrid vehicle as claimed in claim 2, wherein the transmission device comprises an engagement device that selectively interrupts torque transmission between the second motor and the second propeller shaft.

5. The four-wheel drive hybrid vehicle as claimed in claim 1,
    wherein the second propeller shaft extends in a longitudinal direction of the vehicle body,
    the second propeller shaft comprises a first end situated on a side of the first pair of drive wheels, and a second end situated on the other side of the first end in the longitudinal direction of the vehicle body, and
    the second motor is disposed on the second end side.

6. The four-wheel drive hybrid vehicle as claimed in claim 2,
    wherein the second propeller shaft extends in a longitudinal direction of the vehicle body,
    the second propeller shaft comprises a first end situated on a side of the first pairs of drive wheels, and a second end situated on the other side of the first end in the longitudinal direction of the vehicle body, and
    the second motor and the transmission device are disposed on the second end side.

7. The four-wheel drive hybrid vehicle as claimed in claim 1, wherein the first pair of drive wheels is a pair of front wheels, and the second pair of wheels is a pair of rear wheels.

8. The four-wheel drive hybrid vehicle as claimed in claim 1, further comprising:
    a transmission that is connected to an output side of the engine,
    wherein the transmission comprises a clutch that is engaged to transmit torque, and that is disengaged to interrupt torque transmission.

9. The four-wheel drive hybrid vehicle as claimed in claim 8,
    wherein the first motor is disposed on an input side of the transmission coaxially with the engine, and
    the transfer is connected to an output side of the transmission.

10. The four-wheel drive hybrid vehicle as claimed in claim 9, wherein the second motor is situated closer to the second pair of wheels than the transfer.

11. The four-wheel drive hybrid vehicle as claimed in claim 1, wherein the first motor has a generating function.

* * * * *